(12) United States Patent
Raveendran (10) Patent No.: US 7,991,053 B2
(45) Date of Patent: Aug. 2, 2011

(54) METHOD AND APPARATUS TO ENABLE ACQUISITION OF MEDIA IN STREAMING APPLICATIONS

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1425 days.

(21) Appl. No.: 11/120,413

(22) Filed: May 2, 2005

(65) Prior Publication Data

US 2005/0265461 A1 Dec. 1, 2005

Related U.S. Application Data

(60) Provisional application No. 60/568,329, filed on May 4, 2004.

(51) Int. Cl.
H04N 7/12 (2006.01)
(52) U.S. Cl. .......... 375/240.25; 375/240.01; 375/240.12
(58) Field of Classification Search .................. 375/240, 375/240.01, 240.12, 240.25; 386/68; 370/392
See application file for complete search history.

(56) References Cited

U.S. PATENT DOCUMENTS

| | | | |
|---|---|---|---|
| 5,057,916 A | | 10/1991 | Krause et al. |
| 5,708,659 A * | | 1/1998 | Rostoker et al. ............ 370/392 |
| 6,094,456 A * | | 7/2000 | Ueda ........................ 375/240.12 |
| 6,940,904 B2 * | | 9/2005 | Chen et al. ............... 375/240.12 |
| 7,046,910 B2 * | | 5/2006 | Chen et al. ........................ 386/68 |
| 2003/0058941 A1 * | | 3/2003 | Chen et al. ............... 375/240.12 |
| 2004/0184539 A1 | | 9/2004 | Lane |
| 2005/0251843 A1 | | 11/2005 | Walker |
| 2005/0276246 A1 | | 12/2005 | Walker et al. |
| 2005/0281334 A1 | | 12/2005 | Walker et al. |
| 2006/0014535 A1 | | 1/2006 | Walker et al. |

FOREIGN PATENT DOCUMENTS

| | | |
|---|---|---|
| EP | 0 485 798 A | 10/1991 |
| EP | 1 263 238 A | 5/2002 |
| JP | 04286489 | 10/1992 |
| WO | WO03094530 A1 | 11/2003 |

OTHER PUBLICATIONS

International Search Report-PCT/US2005/015457, International Search Authority—European Patent Office—Aug. 17, 2005.
Written Opinion-PCT/US2005/015457, International Search Authority—European Patent Office—Aug. 17, 2005.
Barrau, "H.264 coding efficiency has a price", SAME 2003, Oct. 8 & 9, Session: System on a Chip (2003).

(Continued)

*Primary Examiner* — Allen Wong
(74) *Attorney, Agent, or Firm* — Milan Patel; John G. Rickenbrode (57) ABSTRACT

Methods and apparatus for encoding and decoding multimedia frames are presented. The method comprises encoding a set of acquisition frames including a viewable frame, each frame comprising one or more intra-coded portions and one or more inter-coded portions, wherein the act of encoding the intra-coded portions comprises positioning the intra-coded portions such that when the intra-coded portions of the set of acquisition frames are combined, a complete intra-coded composite frame is formed. The act of encoding the inter-coded portions comprises predicting the inter-coded portions such that the viewable frame is comprised of intra-coded portions and inter-coded portions that are directly or indirectly predicted from the intra-coded portions of the set of acquisition frames.

22 Claims, 8 Drawing Sheets

OTHER PUBLICATIONS

Hannuksela, "Random Access Using Isolated Regions", IEEE, Tampere, Finland (2003).

Liao and Villasenor, "Adaptive intra block update for robust transmission of H.263", Dept. of Elect. Eng., California Univ., Los Angeles, CA; IEEE Transactions on Circuits and Systems for Video Technology (2000).

Hannuksela et al, "Random access using isolated regions", Sep. 14, 2003, pp. 841-844.

Wang et al, "Grandual Decoder Refresh Using Isolated Regions", May 6, 2002, pp. 1-19.

Chiou et al., "Error-Resilient Transcoding Using Adaptive Intra Refresh for Video Streaming," National Chung Cheng University, Chiayi, Taiwan, 2008.

Luthra and Topiwala, "Overview of the H.264/AVC Video Coding Standard," Motorola Inc., San Diego, California, 2003.

Vetro et al., "Reduced Spatio-Temporal Transcoding Using an Intra Refresh Technique," Mitsubishi Electric Research Laboratories, Murray Hill, NJ, Princeton University, Dept. of Elec. Eng, Princeton, NJ, IV-723-IV-726, vol. 4, 2002.

Wang et al, "Error-Robust Inter/Intra Macroblock Mode Selection Using Isolated Regions," Tampere International Center for Signal Processing, Tampere, Finland, 2003.

Worrall et al., "Motion Adaptive Error Resilient Encoding for MPEG-4," Centre for Communications Systems Research, University of Surrey, Guildford, UK, 2001.

\* cited by examiner

METHOD AND APPARATUS TO ENABLE ACQUISITION OF MEDIA IN STREAMING APPLICATIONS

CLAIM OF PRIORITY UNDER 35 U.S.C. §119

The present Application for patent claims priority to Provisional Application No. 60/568,329 entitled "AIR FOR ACQUISTION OF MEDIA IN STREAMING APPLICATIONS" filed May 4, 2004, and assigned to the assignee hereof and hereby expressly incorporated by reference herein.

BACKGROUND

1. Field

This invention relates to methods, apparatus and systems for distributing digital data encoded in a way to enable random access of a data stream.

2. Background

Digital video and audio compression technologies have ushered in an era of explosive growth in digital multimedia distribution. Since the early 1990's, international standards groups such as, for example, the Video Coding Experts Group (VCEG) of ITU-T and the Motion Pictures Expert Group of ISO/IEC, have developed international video recording standards. The standards developed include, for example, MPEG-1, MPEG-2, MPEG-4 (collectively referred to as MPEG-x), H.261, H.262, H.263, and H.264 (collectively referred to as H.26x).

The international video recording standards follow what is known as a block-based hybrid video coding approach. In the block-based hybrid video coding approach, pixels serve as the basis of digital representation of a picture or, as it is commonly called and will be referred to in this application, a frame. A group of pixels form what is known as a block. A common block size for performing digital compression operations on is known as the macroblock. Macroblocks are made up of 16×16 pixels. Sub-macroblocks are made up of smaller sets of pixels including, for example, 16×8, 8×16, 8×8, 8×4, 4×8, and 4×4 pixels. Compression operations can also be performed on sub-macroblocks, therefore in order to not obscure the inventive aspects of the invention, the operations will be discussed as operating on portions of a frame which can include all block sizes or groups of block sizes. A group of macroblocks form what is known as a slice. Slices can be made up of contiguous macroblocks in the form of, for example, a row, a column, a square, or a rectangle. Slices can also be made up of separated macroblocks or a combination of separated and contiguous macroblocks. Slices are grouped together to form a frame at one point in time of a sequence of frames that form a video sequence.

The MPEG-x and H.26x standards describe data processing and manipulation techniques that are well suited to the compression and delivery of video, audio and other information using fixed or variable length source coding techniques. In particular, the above-referenced standards, and other hybrid coding standards and techniques will compress video information using intra-frame coding techniques (such as, for example, run-length coding, Huffman coding and the like) and inter-frame coding techniques (such as, for example, forward and backward predictive coding, motion compensation and the like). Specifically, in the case of video processing systems, hybrid video processing systems are characterized by prediction-based compression encoding of video frames with intra-frame and/or inter-frame motion compensation encoding.

Inter-frame coding techniques exploit temporal correlation between frames in video sequences. Temporal prediction, which is typically used for this purpose, reduces the random access points in the compressed bitstream because decoding of the current temporally predicted frame cannot be accomplished unless the frame upon which the current frame references is previously decoded. Hence, at the decoder or user application end, the received bitstream (in the form of downloaded files or streamed bits in the case of streaming media) may not be played back instantaneously. Instead, decoding may start only at pre-determined random access points in the stream/file such as, for example, Intra-coded frames or IDR frames. IDR, or Instantaneous Decoder Refresh, frames were introduced in H.264 and may be used as a random access point. Information prior (in time) to an IDR frame may not be used as a reference for subsequent frames with any of the above mentioned inter-coding techniques. In video streaming applications, particularly in multicast scenarios, the ability to decode instantaneously (or sooner than later) may be preferable from a user experience point of view.

Intra-coding techniques result in less compression than inter-coding techniques. As a result, increasing the frequency of IDR and Intra-coded frames may cause too high a bit rate while supplying frequent random access points. An improved, potentially lower bit rate method of providing a random access point is needed.

SUMMARY

A method, apparatus and system that enable random access of a video stream from non-Intra-coded frames through use of intra-coded portions within otherwise temporally predicted frames. And further, a series of frames, called an acquisition group of pictures (or acquisition GOP), may be used as a random access point. The acquisition GOP contains temporally predicted frames, each of which may contain Intra-coded regions. When all of the intra-coded regions are combined, an entire picture (or frame, or region) can be viewed.

DETAILED DESCRIPTION

A method, apparatus and system for encoding a frame sequence of digital data so as to enable users of receiving devices to more effectively access video streams is described herein. The method, apparatus and system provide a low-bit rate alternative to an intra-frame encoded access points approach. Certain details have been left out in order to not obscure the inventive aspects of the invention. The specific details not described in the present application are within the knowledge of a person of ordinary skill in the art.

Figure 1:
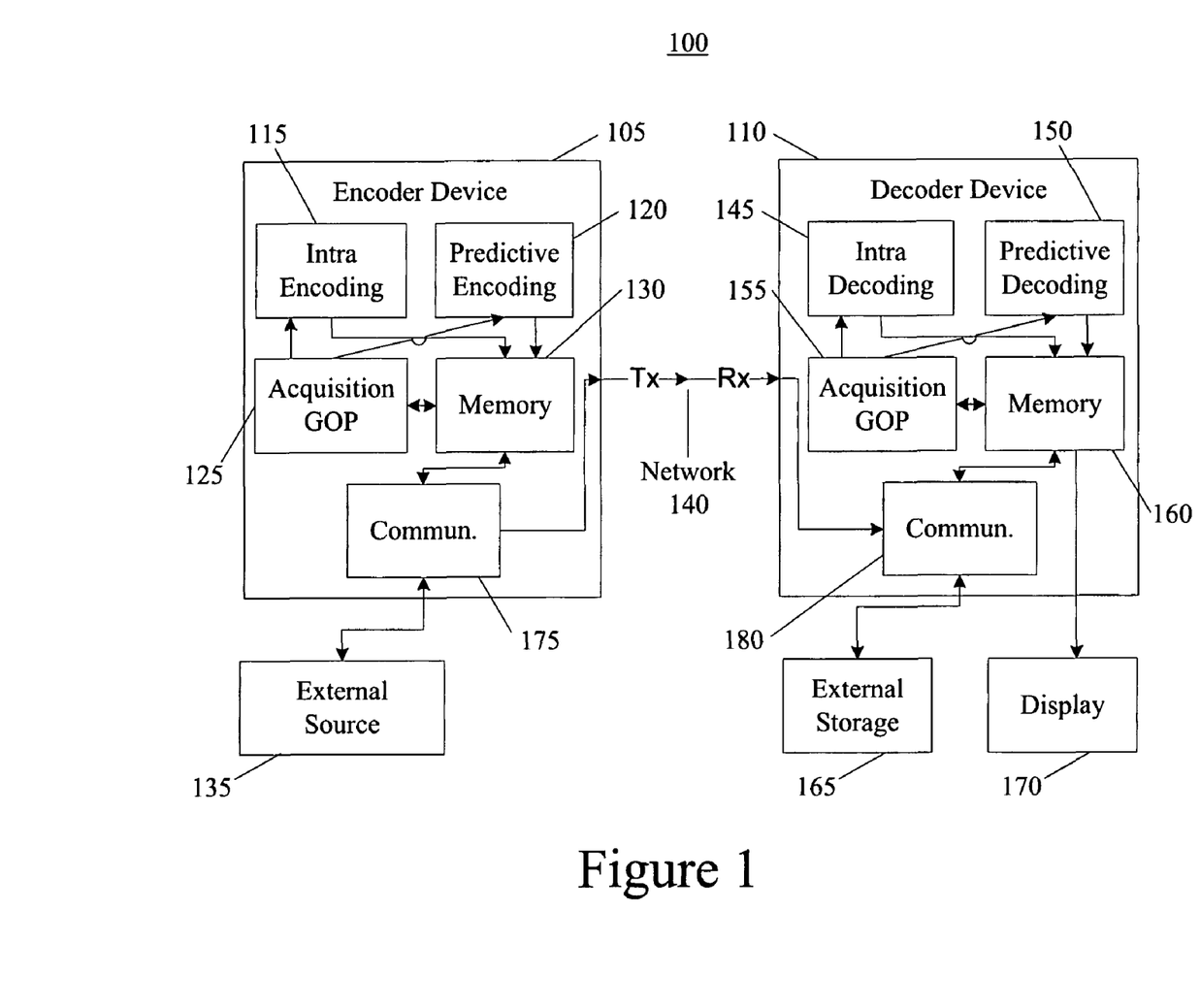
FIG. 1 is a block diagram of a general communications system for encoding and decoding streaming pictures.

FIG. 1 is a block diagram of a general communications system for encoding and decoding streaming pictures. The system 100 includes encoder device 105 and decoder device 110. Encoder device 105 further includes intra encoding component 115, predictive encoding component 120, acquisition GOP component 125, memory component 130 and communications component 175. Encoder device 105 is able to receive data from external source 135 using communication logic contained in communications component 175. External source 135 could be, for example, external memory, the Internet, a live video and/or audio feed, and receiving the data can include wired and/or wireless communications. The data contained in external source 135 can be in a raw (not encoded) or encoded state. Intra encoding component 115 is used to encode intra-coded portions of frames (slices, macroblocks and sub-macroblocks). Predictive encoding component 120 is used to encode predicted portions of frames, including forward prediction, backward prediction and bi-directional prediction. In addition to containing the logic used to encode the predicted frames, predictive encoding component 120 also contains the logic used to choose reference frames for the predicted portions.

Encoder device 105 can access raw or encoded data for encoding. Encoded data can be accessed in order to replace intra-coded portions with inter-coded portions, and vice versa, so as to convert an encoded frame sequence into an acquisition GOP. When accessing encoded data (either intra-coded or inter-coded data), the logic contained in intra encoding component 115 and predictive encoding component 120 decodes the encoded data resulting in reconstructed raw data. This reconstructed raw data, or accessed raw data, can then be encoded in such a way as to include an acquisition GOP. Acquisition GOP component 125 contains logic used to determine which portions of each acquisition frame in an acquisition GOP should be intra-coded by intra encoding component 115, and which portions of each acquisition frame in the acquisition GOP should be inter-coded by predictive encoding component 120. Acquisition GOP component 125 also contains logic restricting which frames in the acquisition GOP can be referenced by inter-coded portions of other frames. After encoding, the encoded frames are stored in memory component 130 or external memory. The external memory can be the same as external source 135 or a separate memory component (not shown). Communications component 175 contains logic used for transmission (Tx) in conjunction with network 140. Network 140 can be part of a wired system such as telephone, cable, and fiber optic, or a wireless system. In the case of wireless, communication systems, network 140 can comprise, for example, part of a code division multiple access (CDMA or CDMA2000) communication system or alternately, the system can be a frequency division multiple access (FDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. The encoded frames are transmitted (Tx) over network 140. The encoding processes performed by the components of encoder device 105 are more fully described below.

Decoder device 110 contains similar components to encoder device 105, including, intra decoding component 145, predictive decoding component 150, acquisition GOP component 155, memory component 160 and communications component 180. A decoder device that has no acquisition GOP component can proceed with decoding in a normal manner where acquisition is oblivious to the decoder and still be afforded a random access point. Acquisition GOP component 155 can allow the decoder to locate an acquisition GOP and decode only those portions necessary for acquisition, thus improving the efficiency of the decoding process. Decoder device 110 receives encoded data that has been transmitted over network 140 or from external storage 165. Communications component 180 contains logic used for receiving (Rx) encoded data in conjunction with network 140, as well as logic for receiving encoded data from external storage 165. External storage 165 could be, for example, external RAM or ROM, or a remote server. Intra decoding component 145 is used to decode intra-coded data. Predictive decoding component 150 is used to decode inter-coded data. Acquisition GOP component 155 contains logic used for enabling initial acquisition of a bitstream containing an acquisition GOP, such as after channel switching by a user, or upon first acquiring a signal. An acquisition GOP contains a number of acquisition frames. The acquisition GOP is first identified and then those portions of the acquisition frames that are intra-coded are decoded by intra decoding component 145. Any subsequent inter-coded portions of the acquisition frames referencing the decoded intra-coded portions are decoded by predictive decoding component 150. After all intra-coded portions and subsequent inter-coded portions of all the acquisition frames contained in the acquisition GOP are decoded, the result is a completely refreshed viewable frame made up of the combined intra-coded and inter-coded portions. After decoding, the decoded frames can be displayed on display component 170 or stored in internal memory 160 or external storage 165. Display component 170 can be an integrated part of the decoding device, such as a display screen on a phone or PDA (personal digital assistant) or an external peripheral device. The decoding processes performed by decoder device 110 are more fully described below.

Intra-coding, as used in intra encoding block 115 and intra decoding block 145 of FIG. 1, is a method of digital compression based on the current portion of a picture without reference to other pictures. Intra-coding may first use spatial prediction where pixel values can be predicted from their neighbor pixel values. Currently, only H.264 supports spatial prediction. H.264 supports two spatial prediction modes for luma values, namely 16×16 macroblock spatial prediction and 4×4 sub-macroblock spatial prediction. H.264 provides one prediction mode for chroma, namely 8×8. In 8×8 mode, an 8×8 chroma block is predicted in ways similar to the 16×16 luma macroblock. After spatial prediction, the residual information is transformed using, for example, a discrete cosine transform (DCT), or an integer transform in the case of H.264, and then quantized. Intra-coding may be done on the slice level where a slice may be made up of a group of macroblocks (16×16 pixel macroblocks). An intra-coded slice or I-slice contains only intra-coded macroblocks and does not use temporal prediction. An entire frame may be intra-coded, known as an I-frame, and may be used as a random access point. An I-frame (or I-slice) contains all the necessary information to display the picture represented by the compressed data unlike an inter-coded or predicted frame that is discussed below. For this reason, I-frames can be used for the initial frame in a random access scenario. However, I-frames may not provide as much compression as an inter-coded or predicted frame.

The DCT is only one type of invertible 2-dimensional transform that can be used. Other possible transforms include, for example, a discrete wavelet transform (DWT), an integer transform like in H.264, or a Hadamard transform. The quantization of the transformed coefficients can be changed for every macroblock. After quantization, entropy coding such as, for example, Huffman coding, variable length coding or binary arithmetic coding is used for further digital compression. Entropy coding can replace strings of bits that occur most often with shorter codes and can replace strings of bits that occur less often with longer codes. Entropy coding can be context adaptive in order to take advantage of patterns as they appear in the data being coded. Context adaptive coding can operate on the slice level or lower such as, for example, macroblock level, or sub-macroblock level.

Inter-coding or, as it is also known, predictive coding is a form of temporal prediction which can take advantage of similarities between time points using, for example, motion estimation to allow for greater digital compression than intra-coding. Inter-coding is performed by predictive encoding block 120 and predictive decoding block 150 in FIG. 1. Inter-coding can look at each picture on a macroblock level or lower by searching reference pictures at another time point for similar blocks. If a match is found, instead of storing all the DCT coefficient values for the entire block, the system stores a much smaller motion vector and residual error. The motion vector describes the movement (or lack of movement) of the block between temporal pictures, and the residual error component corrects for any error in the predicted block. In this way, efficient compression is achieved.

Inter-coding includes, for example, forward prediction, backward prediction and bi-directional prediction from one or more reference frames. In forward prediction, a best matching macroblock in the reference frame is used as a prediction for a macroblock in a subsequent frame. In backward prediction, a best matching macroblock in the reference frame is used as a prediction for a macroblock in a previous frame. In bi-directional prediction, the current frame being inter-coded is located between a previous reference frame and a subsequent reference frame. Best matching macro blocks from the previous and subsequent reference frames are combined (combined using, for example, a simple average or a weighted average) to form a prediction for a macroblock in the current frame. Forward prediction, backward prediction, and bi-directional prediction, from any number of reference frames, are herein collectively referred to as "inter-coding" or as "inter-coded" techniques.

Figure 2A:
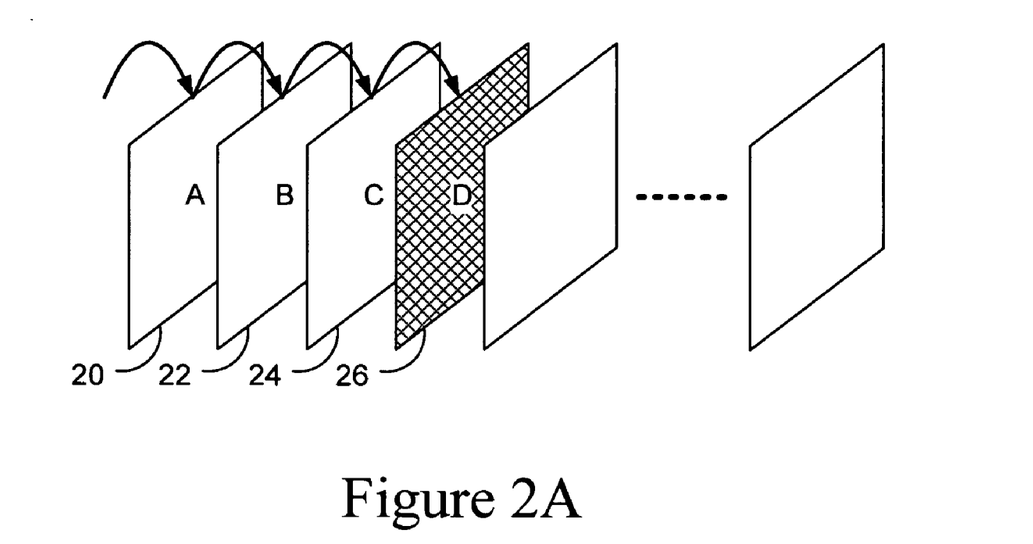
FIG. 2A depicts sequential access of a frame-based bitstream.
Figure 2B:
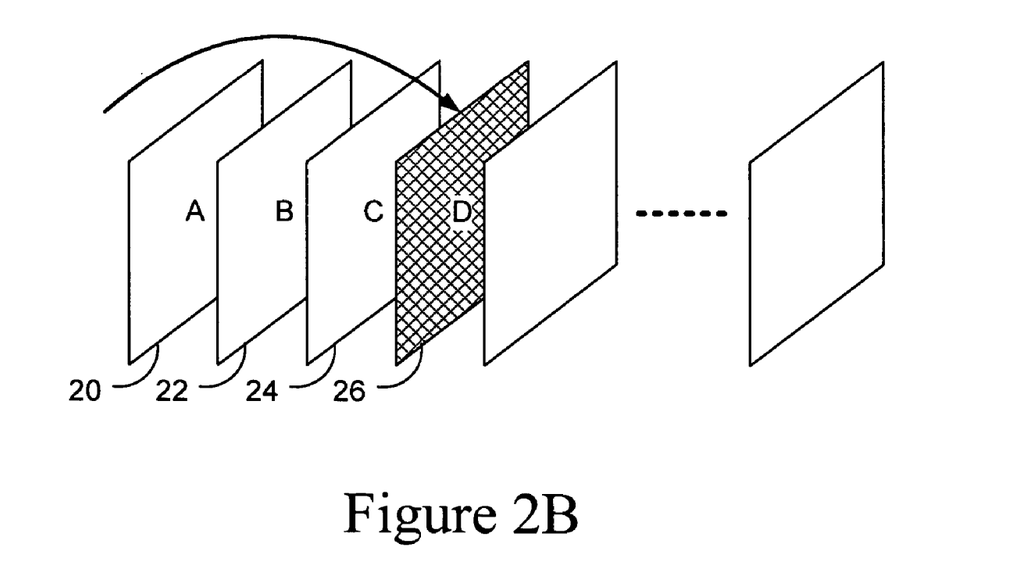
FIG. 2B depicts random access of a frame-based bitstream.

Random access refers to the ability to access data at any point in time. Sequential access, unlike random access, requires decoding of all intervening points. FIG. 2A depicts sequential access of a frame-based bitstream. Frames 20, 22, 24 and 26 are decoded sequentially. This would be the case if frame 22 was forward predicted from frame 20, frame 24 was forward predicted from frame 22, and frame 26 was forward predicted from frame 24. FIG. 2B depicts random access of a frame-based bitstream. Frame 26 is immediately decoded without decoding frames 20, 22 or 24. Frame 26 could be decoded if, for example, it was an entirely intra-coded frame.

Video acquisition is a form of random access, which can involve other restraints such as, for example, system acquisition at lower OSI (open systems interconnection) layers. Video acquisition refers to the state when the application layer (where the video decoder can reside) is able to commence display of video. In the case of hybrid coded video bitstreams, due to inter-coding, random access or video acquisition may not be accomplished on all frames. The decoder may move back and forth in the bitstream to locate the random access point. Intra-coding an entire frame is one method of providing a random access point. However, some power limited devices, processor-limited devices, or data-rate-limited channels may not be able to accommodate frequent intra-coding of entire frames of data.

Figure 3:
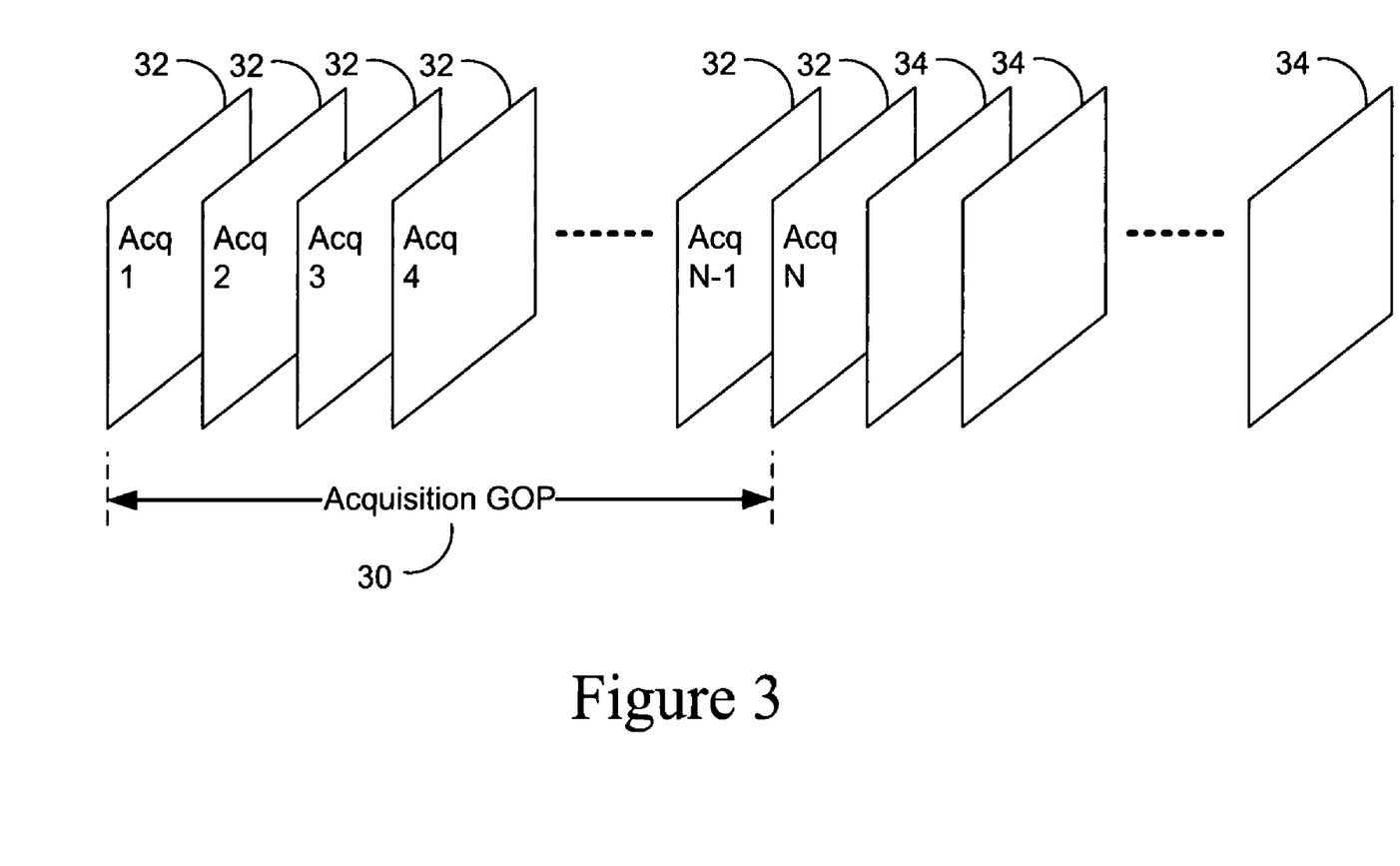
FIG. 3 is an illustration of an example of an acquisition GOP frame sequence.

The acquisition GOP provides an alternative to intra-coding an entire video frame to provide random access points. FIG. 3 is an illustration of an example of an acquisition GOP frame sequence. The acquisition GOP 30 contains N acquisition frames 32 (frames labeled "Acq 1" through "Acq N") that include intra-coded portions. Also shown in the bitstream, outside the acquisition GOP, are non-acquisition frames 34 (unlabeled frames). The intra-coded portions can be in any shape or size such as, for example, pixels, blocks, sub-macroblocks, macroblocks or slices. Each acquisition frame 32 also contains inter-coded portions made up of the remaining blocks that are not intra-coded. Non-acquisition frames 34 may also contain both intra-coded and inter-coded portions.

Figure 4:
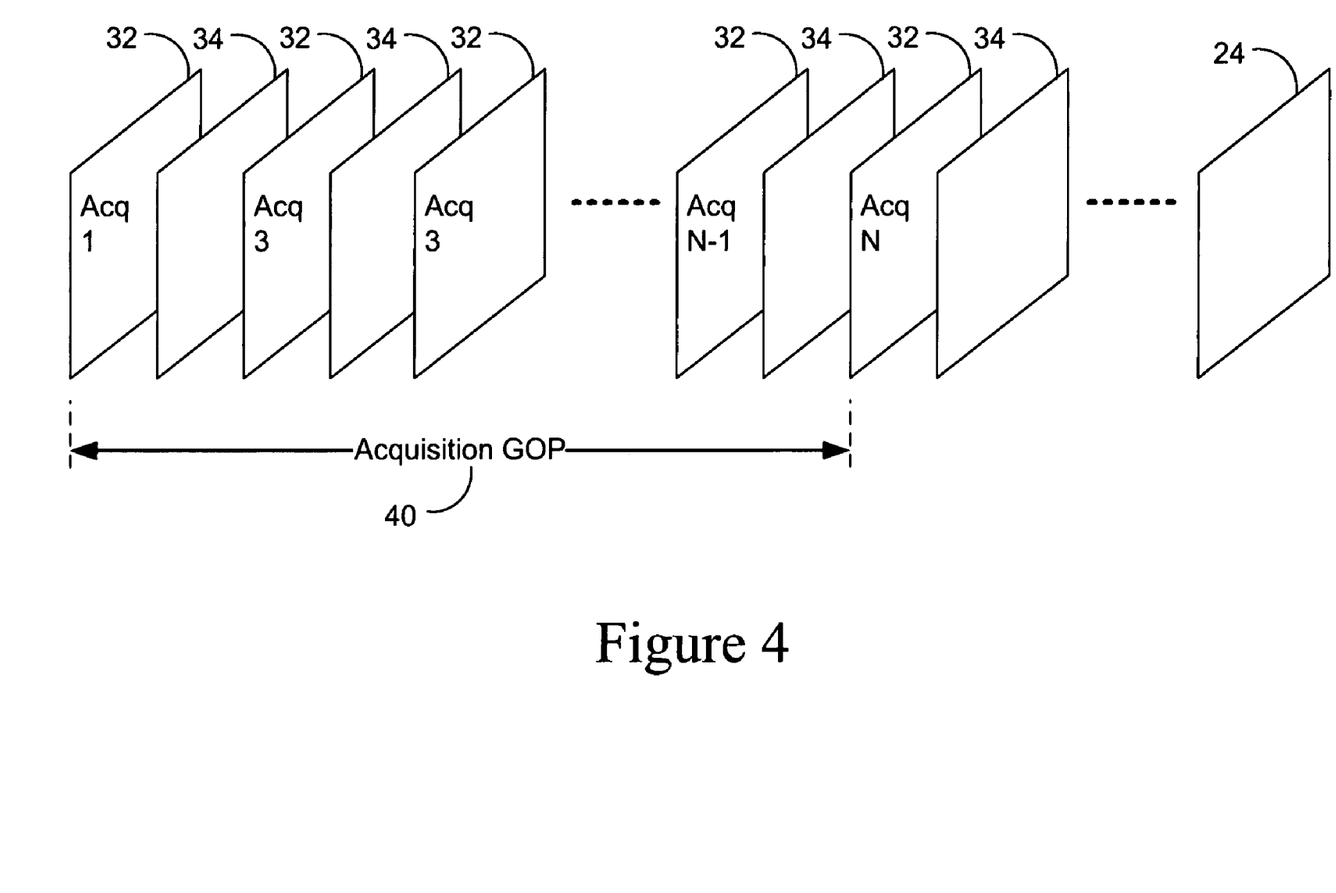
FIG. 4 is an illustration of another example of an acquisition GOP frame sequence.

FIG. 4 is an illustration of another example of an acquisition GOP frame sequence. This example includes non-acquisition frames 34 interspersed between N acquisition frames 32 (labeled "Acq 1" through "Acq N") in the acquisition GOP 40. Interspersing non-acquisition frames between acquisition frames increases the delay in video acquisition, but it can provide better compression efficiency or reduced bitrate when lower layers don't provide random access at the corresponding granularity. The acquisition frames 32 contain intra-coded and inter-coded portions. Non-acquisition frames 34 that are interspersed between acquisition frames 32 may or may not have to follow restrictions on inter-coding as discussed below, depending on whether or not the acquiring device decodes non-acquisition frames during acquisition. The restrictions on inter-coding discussed below allow an acquiring device to achieve proper acquisition without inter-predicted portions becoming corrupted due to dependence on a non-decoded portion.

In order for a decoder to establish video acquisition, the decoder decodes the intra-coded portions of the N acquisition frames in the acquisition GOP. Inter-coded portions (forward, backward or bi-directional) contained in other frames (acquisition or non-acquisition frames) that reference previously decoded portions (inter-coded or intra-coded portions) in the acquisition GOP can be decoded as well. Positioning intra-coded portions (as presented below), an intra-coded composite can be formed by combining the intra-coded portions of the N acquisition frames. After N acquisition frames in the acquisition GOP are decoded and the combined intra-coded composite is formed, video acquisition is completed.

An example utilizes acquisition GOP's located at predetermined intervals in the bitstream. Including an acquisition GOP at a regularly spaced time period such as, for example, every one or two seconds, can allow a receiving device attempting random access to easily search a small amount of bitstream data to locate the acquisition GOP and obtain video acquisition quickly, thereby improving a user's experience. Typically, I frames would be included in the bitstream to allow for frequent random access, but at the cost of less compression and higher data rate or less quality for the same data rate. Thus, with the method described, delay in acquiring a bit stream, such as when changing channels, can be reduced while affording a lower data rate than I frames alone.

Figure 5:
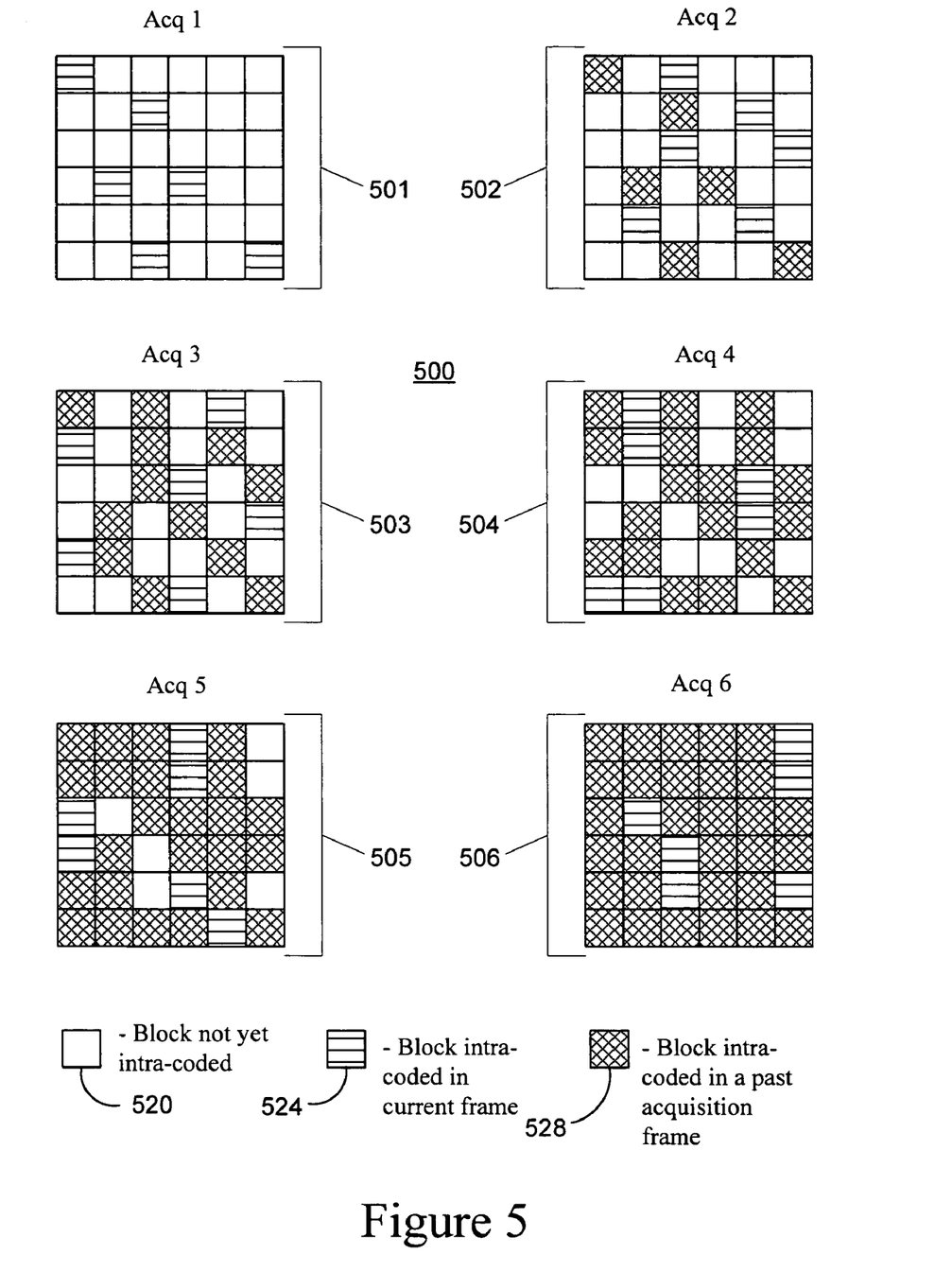
FIG. 5 depicts a frame sequence where intra-coded portions are encoded.

FIG. 5 depicts a frame sequence where intra-coded portions are encoded. This depiction uses blocks only as an example whereas portions of any size or shape could be used. Acquisition GOP 500 in this example is comprised of six acquisition frames 501-506. Each acquisition frame 501-506 includes six intra-coded blocks 524. Acquisition frames 501-506 also depict blocks not yet intra-coded 520 and previously intra-coded blocks 528. If no blocks are intra-coded twice (as is the case in the example shown in FIG. 5), then the entire frame will be intra-coded in six acquisition frames as can be seen in frame 506. It should be noted that this example shows the same number of blocks being intra-coded in each frame of acquisition GOP 500, but this is not necessary. As long as each portion of the picture to be displayed is intra-coded at least once in acquisition GOP 500, the video acquisition can be obtained by the time the last acquisition frame is decoded. Thus, at the end of acquisition GOP 500, every portion of a frame has been intra-coded.

Since the acquisition frames 501-506 could be transmitted over a network to multiple receiving devices, some of which will have already acquired the video stream, every block in each acquisition frame 501-506 must be encoded. The blocks that are not intra-coded in each acquisition frame are inter-coded and referenced to one or more frames where the corresponding best-matching portion is intra-coded or inter-coded. Receiving devices that have already acquired the video stream already have the information related to other frames (forward or backward) for the purposes of decoding the inter-coded portions of the acquisition (or non-acquisition) frames within the acquisition GOP. However, special care needs to be taken in order to allow for video acquisition when inter-coding portions of the acquisition frame that have been intra-coded in, for example, a previous acquisition frame.

In the example shown in FIG. 5, if acquisition is to be completed at frame 506 resulting in a viewable frame 506, then the portions of frame 506 that are not intra-coded need to be inter-coded in reference to intra-coded portions within the acquisition GOP, or reference inter-coded portions that have reference points of origin at the intra-coded portions within the acquisition GOP. Put another way, viewable frame 506 will be comprised of the 6 intra-coded blocks and the inter-coded blocks will be directly or indirectly predicted from intra-coded blocks in acquisition frames 501-505. In addition, inter-coded portions in frames subsequent to the acquisition GOP need to reference intra-coded portions within or subsequent to the acquisition GOP, or reference inter-coded portions that have reference points of origin within or subsequent to the acquisition GOP. More details on inter-coding restrictions involving the acquisition GOP are presented below.

Figure 6:
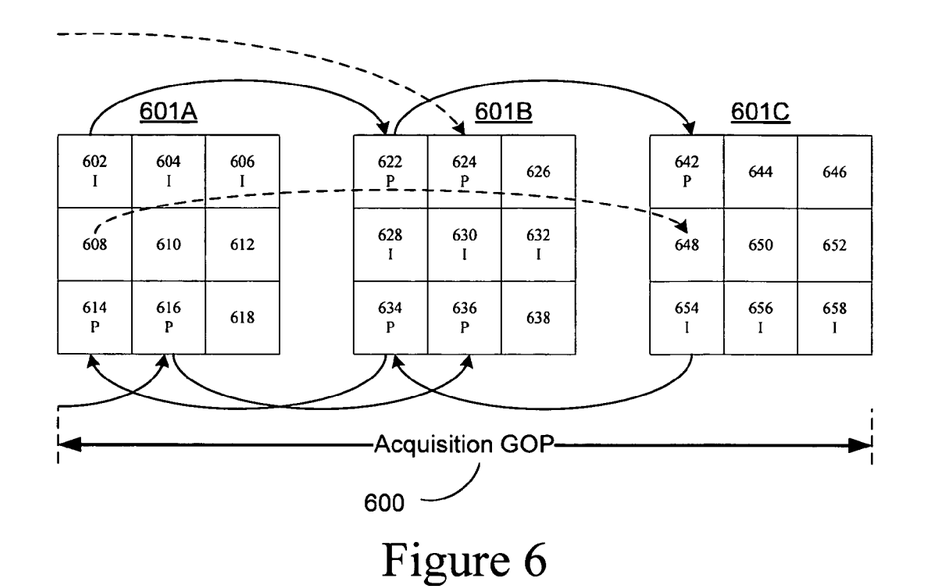
FIG. 6 is an illustration of an example of an acquisition GOP frame sequence.

FIG. 6 is an illustration of an example of an acquisition GOP frame sequence. Acquisition GOP 600 contains 3 acquisition frames 601A, 601B and 601C with 9 blocks in each frame. For ease of explanation, the example in FIG. 6 assumes that there is negligible motion between frames for all blocks 602-658. Effects of motion between an inter-coded block and the corresponding best-matching block in another frame will be discussed below in reference to FIG. 7. One row of blocks is intra-coded in each frame of acquisition GOP 600, row 1 of frame 601A containing intra-coded blocks 602-606, row 2 of frame 601B containing intra-coded blocks 628-632, and row 3 of frame 601C containing intra-coded blocks 654-658. In order for an acquiring device to complete acquisition of an entire uncorrupted frame, several restrictions on inter-coding of blocks in the acquisition frames must be followed. Since first row blocks 602-606 were intra-coded in frame 601A, the first row blocks 622-626 and 642-646 in subsequent frames 601B and 601C, respectively, will need to be inter-coded in order to not intra-code them a second time. Predicted block 622 is forward predicted from block 602, where block 602 was intra-coded in acquisition frame 601A. Predicted block 642 is forward predicted from predicted block 622 and block 642 can be displayed in acquisition frame 601C along with all the other inter-coded blocks 644-652 and intra-coded blocks 654-658. Since both blocks 642 and 622 depend on intra-coded block 602 in the first acquisition frame 601A, they can be decoded and displayed by an acquiring device that receives all the frames in acquisition GOP 600. If an acquiring device did not receive all the frames in acquisition GOP 600, then the acquiring device could locate a subsequent acquisition GOP or it could continue decoding but complete acquisition may not occur until the next acquisition GOP is decoded. Another example of proper inter-coding within an acquisition GOP is shown where block 616 is predicted from a frame preceding the acquisition GOP, and block 636 is predicted from block 616. This is acceptable because collocated block 656 in the final acquisition frame 601C is intra-coded and therefore can be displayed at completion of acquisition.

An example of an inter-coding restriction would be to avoid predicting block 624 from a reference frame preceding acquisition frame 601A containing intra-coded block 604. Since an acquiring device has not decoded frames prior to the acquisition GOP, it would not have the necessary best-matching block to construct block 624 or block 644 (assuming block 644 is predicted from block 624), and, therefore, block 644 would be corrupted in acquisition frame 601C. Block 624, instead should be predicted from intra-coded block 604 and block 644 could then be predicted from block 624 (or block 604).

Another example of an inter-coding restriction would be to avoid predicting block 648 in acquisition frame 601C from block 608, which is predicted from a frame preceding the acquisition GOP. Since an acquiring device is not able to decode block 608, it cannot reconstruct block 648 and the final acquisition frame would again be corrupted. If block 648 were predicted from intra-coded block 628, then a proper block 648 would be decoded and could be displayed in acquisition frame 601C.

In general, if every inter-coded block in the last acquisition frame 601C is directly or indirectly predicted from an intra-coded block in another acquisition frame of the same acquisition GOP then a frame that is able to be fully acquired, is viewable, and is based on predictions from the intra-coded composite will exist in the final acquisition frame.

If blocks in earlier acquisition frames are backward predicted from later acquisition frames, then complete acquisition and a viewable frame can occur in an earlier frame, but the decoding delay will be greater. For example, block 634 can be predicted from intra-coded block 654, and block 614 can be predicted from block 634. If blocks 608-618 are all predicted from intra-coded blocks in later acquisition frames, then an entire first frame 601A (including intra-coded blocks 602-606) can be displayed, but only after decoding all referenced blocks in the later frames.

After acquisition is complete (in the third and final frame 601C in the example acquisition GOP 600), inter-coded blocks in subsequent frames should still not reference blocks that have not been decoded by an acquiring device.

Figure 7:
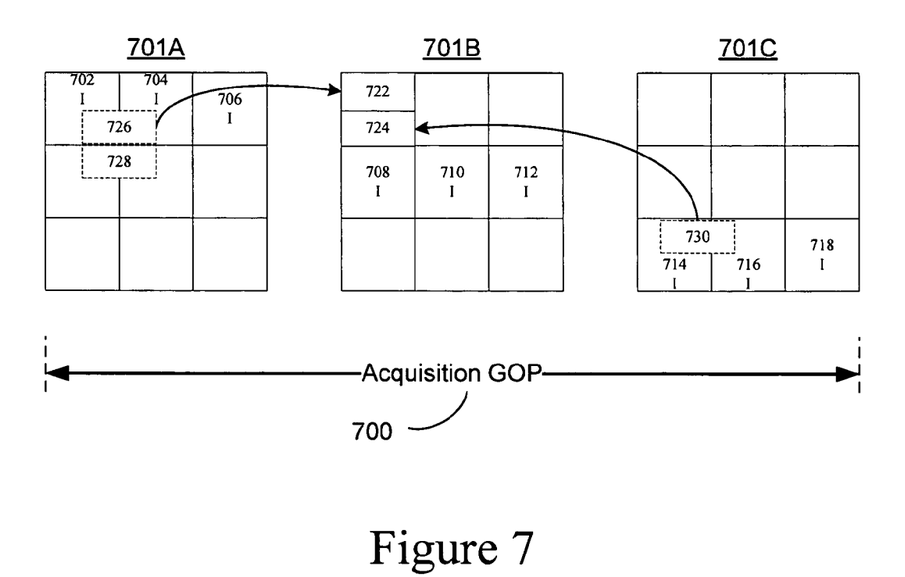
FIG. 7 is an illustration of an example of an acquisition GOP frame sequence.

For ease of explanation, the inter-coding methods discussed above, in reference to FIG. 6, did not take into account the effects of motion between best matching blocks and the predicted blocks. FIG. 7 is an illustration of an example of an acquisition GOP frame sequence. As in FIG. 6, example acquisition GOP 700 has three acquisition frames 701A, 701B and 701C with intra-coded blocks 702-718. Blocks 702, 704 and 706 make up the first row of first acquisition frame 701A, blocks 708, 710 and 712 make up the second row of second frame 701B and blocks 714, 716 and 718 make up the third row of third frame 701C. Because of motion between the best matching block and the block comprised of sub-blocks 722 and 724 in second acquisition frame 701B, the entire block comprised of sub-blocks 722 and 724 cannot be matched by an entire intra-coded block in first acquisition frame 701A. Sub-block 722 is a good match to sub-block 726 which is located within intra-coded blocks 702 and 704 and therefore, sub-block 722 is predicted from sub-block 726. In this example, sub-block 728 in the first acquisition frame that would match sub-block 724 is located in the second row and is not intra-coded. Predicting sub-block 724 from non-intra-coded sub-block 728 would result in a corrupted reconstructed block in an acquiring device. Sub-block 724 should instead be predicted from another intra-coded portion of another acquisition frame or another inter-coded portion that can trace its prediction history to intra-coded or inter-coded portions that the acquiring device would have already decoded. In this example, intra-coded sub-block 730 is found to be a good match to sub-block 724 and sub-block 724 is backward predicted from sub-block 730 that is fully contained in intra-coded blocks 714 and 716. If no portions were identified in the acquisition frames that matched sub-block 724 sufficiently, then sub-block 724 would need to be intra-coded. This example demonstrates that grouping neighboring blocks in the intra-coded portions in acquisition frames can be of benefit to allow for motion compensated prediction to other acquisition frames.

The acquisition GOP examples shown in FIGS. 5-7 and discussed above can utilize acquisition GOP's similar to, for example, that shown in FIG. 3 with no intervening non-acquisition frames or that shown in FIG. 4 where non-acquisition frames are interspersed between the acquisition frames. Non-acquisition frames can include inter-coded and intra-coded portions. Intra-coded portions in a non-acquisition frame could include, for example, areas that are intra-coded for purposes other than providing acquisition such as for stopping error propagation or enabling scene change scenarios where inter-coding would not be useful. Acquisition frames could also include intra-coded portions that were encoded for reasons other than acquisition. When intra-coded portions are included in acquisition frames or non-acquisition frames for these non-acquisition reasons, the algorithm for choosing which portions to intra-code could adapt such that portions are not intra-coded more than once in an acquisition GOP.

The example depicted in FIG. 5 used a random method to position the intra-coded portions in each acquisition frame and the examples depicted in FIGS. 6 and 7 used single rows to position the intra-coded portions. As one of ordinary skilled in the art will recognize, other methods could be utilized for choosing which portions of the frame to intra-code such as, for example, two or more rows or part or a row, one or more columns or part of a column, or any combination of contiguous or non-contiguous portions. Also, the number of acquisition frames chosen for the examples were six and three, but any number of acquisition frames greater than or equal to two could be used. Also, instead of the video object being a frame filling the entire display of a display device, the video object could be a sub-frame (such as a picture in picture display or a window) taking up part of a display.

Figure 8:
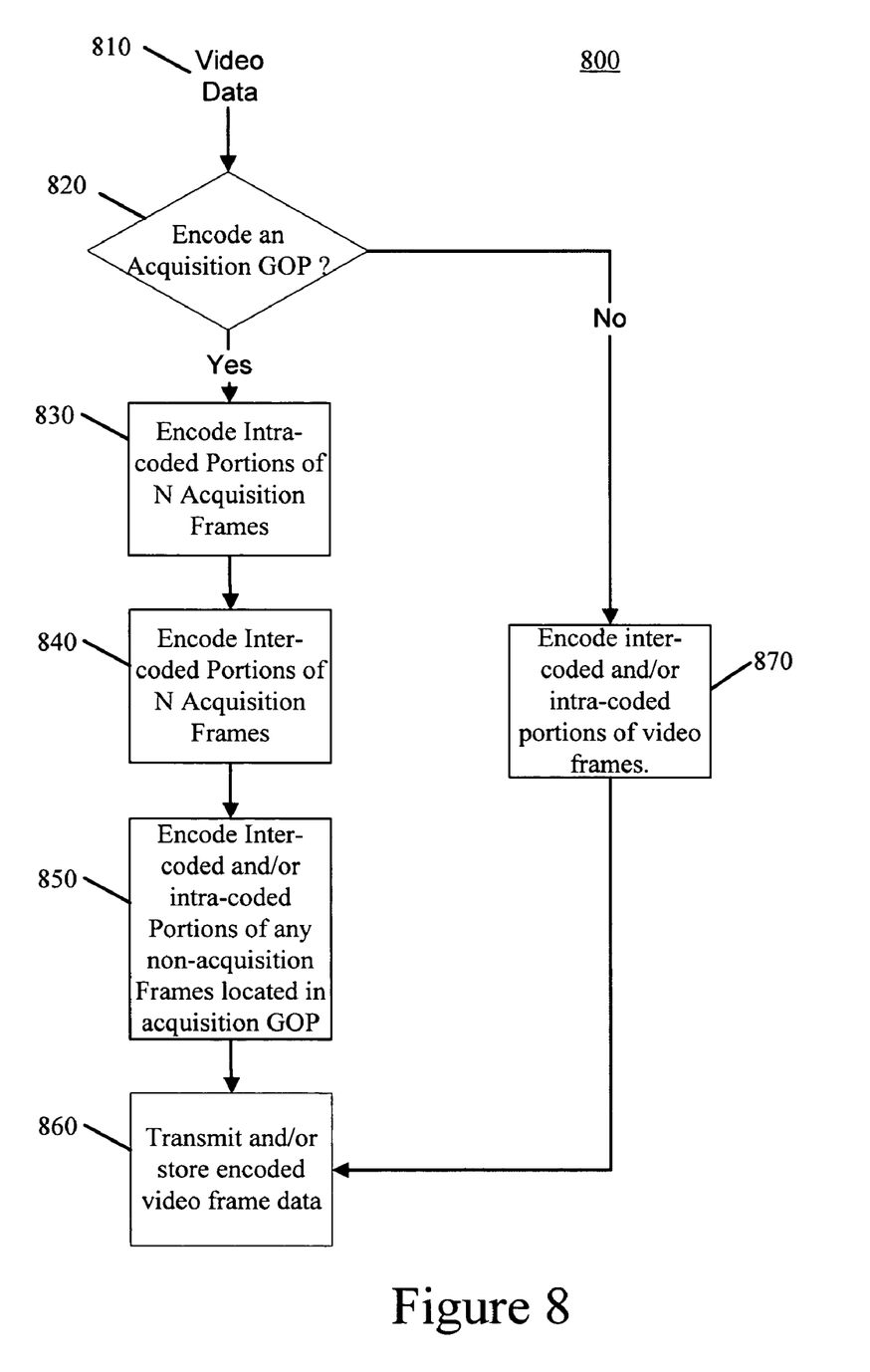
FIG. 8 is a flowchart illustrating one example of an encoding process including an acquisition GOP.

FIG. 8 is a flowchart illustrating one example of an encoding process including an acquisition GOP. Process 800 can be performed on a microprocessor contained in a video source network device such as encoder device 105 in FIG. 1. An encoder device could be, for example, an internet server, a wireless base station, or a personal computer, as well as a remote device such as a PDA or a mobile handset. Video data 810 that is to be compressed is input to the process. A decision 820 to encode an acquisition GOP can be based on factors such as, for example, a predetermined time elapsed since the last acquisition GOP. Determining means such as acquisition GOP component 125 from FIG. 1 performs decision 820. If no acquisition GOP is desired, then intra-coding (using, for example, DCT or DWT) and inter-coding (using, for example, forward or backward predictive motion compensated, or bi-directional predictive motion compensated coding), step 870, is performed on the input video data 810 in the normal fashion. Encoding means such as intra-encoding component 115 and predictive encoding component 120 from FIG. 1 perform step 870. If an acquisition GOP is to be encoded, then encoding of intra-coded portions of the N acquisition frames, step 830, as well as encoding of inter-coded portions of the N acquisition frames, step 840, are performed. Encoding means such as intra-encoding component 115 and acquisition GOP component 125 from FIG. 1 perform encoding step 830. The acquisition GOP component determines which portions of the acquisition frames are intra-coded such that a complete intra-coded composite frame is formed in step 830. Encoding means such as predictive encoding component 120 and acquisition GOP component 125 from FIG. 1 perform encoding step 840. The acquisition GOP component determines which frames are used to predict inter-coded portions in step 840, such that corruptions resulting from improper inter-coding, as discussed above, do not occur. Intra-coded portions and inter-coded portions (including reference frames) of the acquisition frames are assigned and encoded as discussed above. If the acquisition GOP is to contain non-acquisition frames interspersed among the acquisition frames, then encoding of the intra-coded portions and inter-coded portions of the non-acquisition frames, step 850, is performed. Encoding means such as intra encoding component 115 and predictive encoding component 120 from FIG. 1 perform step 850. Encoded video data output by encoding steps 830, 840, 850 and 870 can include overhead information. Overhead information can include a map of intra-coded and inter-coded portions, such as, for example a macro-block map where macroblocks (or sub-macroblocks) are identified as being intra-coded or inter-coded and to which frame inter-coded portions are referenced. The encoded video data can be stored into a memory module for later use, or transmitted over a network to one or more receiving devices, step 860. Storing means such as memory component 130 from FIG. 1 performs the storing portion of step 860. Transmitting means such as communications component 175 and network 140 from FIG. 1 perform the transmitting portion of step 860. Steps 820 through 870 can be repeated until the video data is exhausted.

Figure 9:
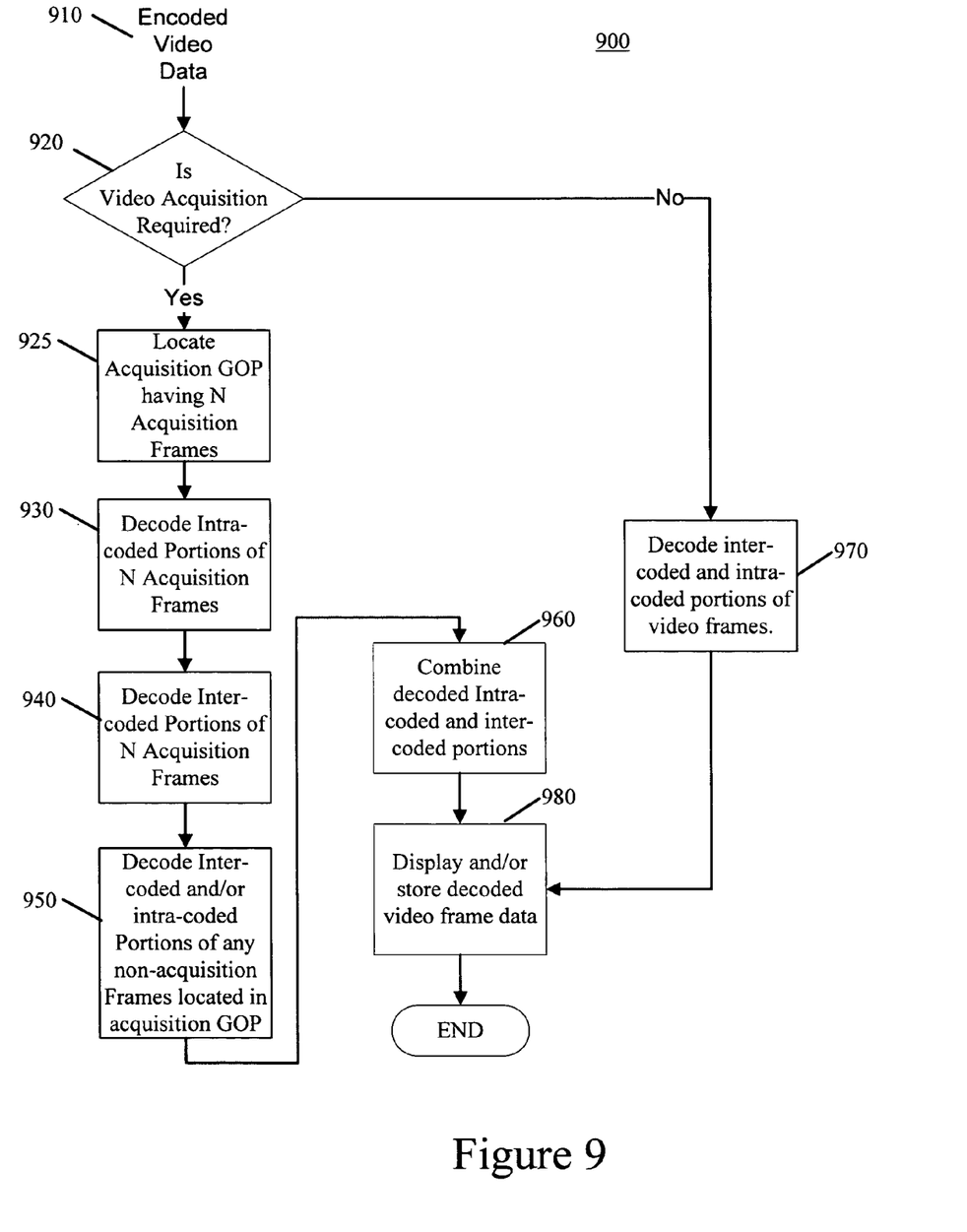
FIG. 9 is a flowchart illustrating an example of a decoding process including an acquisition GOP.

FIG. 9 is a flowchart illustrating an example of a decoding process including an acquisition GOP. Process 900 is performed by an electronic device such as decoder device 110 from FIG. 1. Process 900 can be performed on a microprocessor contained in a video display device or contained in a peripheral device connected to a video display device such as, for example, a personal computer, a digital television, or a set top box (e.g., cable or satellite) connected to a television. Process 900 could also be performed on a remote device such as, for example, a PDA or a mobile handset. A decoder device receives encoded video data 910, which is encoded by a device such as encoder device 105 from FIG. 1 using process 800 above. Encoded video data 910 can be received with receiving means such as communications component 180 and network 140 from FIG. 1. Receiving means also includes external storage component 165 and memory component 160 from FIG. 1 where encoded data can be stored and later retrieved.

If video acquisition is unnecessary because it has already been performed, as determined by an acquisition GOP component at step 920, then decoding of the video frames can proceed in a normal manner, step 970. Decoding means such as intra decoding component 145 and predictive decoding component 150 from FIG. 1 perform step 970. If the decoder at step 920 determines that video acquisition is necessary, such as when a mobile device is turned on or when a user switches channels, then the decoder locates an acquisition GOP, step 925. Locating an acquisition GOP can involve searching the bit stream for an encoded identifier bit string or flag. If an a priori arrangement involving acquisition GOP's located at predetermined intervals is used, as presented above, then the decoder can search the bit stream at or near the predetermined time point. Random access points can also be utilized for locating an acquisition GOP. A random access bit string or flag can be marked in various places in the stream such as, for example, transport layer, sync layer, or network abstraction layer. Locating a random access acquisition GOP involves searching the stream at the layer or layers where a random access flag or bit string can be located. Once the acquisition GOP is located, locating intra-coded portions and inter-coded portions contained in acquisition frames and/or non-acquisition frames within the acquisition GOP can be accomplished by utilizing overhead information including a map of intra-coded and inter-coded portions, such as, for example a macro-block map as discussed above. Locating means such as acquisition GOP component 155 from FIG. 1 performs locating step 925.

After locating the start of the acquisition GOP, the decoder can decode intra-coded portions of the N acquisition frames, step 930. Decoding means such as intra decoding component 145 from FIG. 1 performs step 930. Once intra-coded portions are decoded, they can be stored in memory and can also be used to decode any inter-coded portions 940 that reference them. Inter-coded portions that reference frames in which the corresponding portions have not been decoded are skipped from decoding since the information needed to properly decode them is missing. Decoding means such as predictive decoding component 150 from FIG. 1 performs step 940. The decoder can choose to decode or not decode non-acquisition frames located within the acquisition GOP, step 950. Since all information necessary to achieve video acquisition is in the acquisition frames, the non-acquisition frames are not needed for acquisition. If, on the other hand, an enhanced pre-final-acquisition video can be had as a result of information in the non-acquisition frames, then the decoder could decode intra-coded portions in the non-acquisition frames as well as inter-coded portions in the non-acquisition frames that reference already decoded portions. Decoding means such as intra decoding component 145 and predictive decoding component 150 from FIG. 1 perform step 950. After the intra-coded portions and the inter-coded portions predicted from the intra-coded portions of the N acquisition frames have been decoded, the decoded video information can be combined, step 960, to form a fully viewable frame and video acquisition will be completed. Combining means such as acquisition GOP component 155 from FIG. 1 performs step 960. The decoded video information can be displayed or stored into memory for use later, step 980. Storing means such as external storage component 165 or memory component 160 from FIG. 1 perform the storing portion of step 980. The video could be displayed as it is being decoded, or it could be displayed once the entire viewable frame is combined. Displaying means such as display component 170 from FIG. 1 perform the displaying portion of step 980. After video acquisition is completed, the remaining encoded video data can be decoded in a normal fashion, step 970. Process 900 is an example that enables efficient decoding during video acquisition. However, a decoder can decode all encoded video data 910, including the acquisition GOP data, by simply decoding in a normal fashion, step 970. The acquisition GOP will still provide a random access point, but the decoder may be unable to decode inter-coded portions, and therefore not be able to display a proper picture at step 980, until the intra-coded portions of the acquisition GOP are decoded.

The methods described can be used for any network, wired or wireless. Networks where data error rates can be fairly high, such as, for example, wireless LAN's (local area networks), wireless WAN's (wide area networks) or cellular networks, can benefit from the use of acquisition GOP's. Acquisition GOP's offer a low bit rate alternative to I Frames for providing random access points that are useful for channel switching in a multi-channel video delivery system. Acquisition GOP's can tend to prevent error propagation and drift error since the introduction of the intra-coded portions will form a new starting point for decoding since no inter-coded portion, positioned in the same position as one of the intra-coded portions contained in one of the encoded acquisition frames, should reference a frame occurring prior to the encoded acquisition frame within which the portion was intra-coded.

Aspects of the methods, apparatus and system described include, but are not limited to, the descriptions below.

A method of encoding multimedia frames, comprising: encoding a set of acquisition frames including a viewable frame, each frame comprising one or more intra-coded portions and one or more inter-coded portions, wherein the act of encoding the intra-coded portions comprises positioning the intra-coded portions such that when the intra-coded portions of the set of acquisition frames are combined, a complete intra-coded composite frame is formed, and wherein the act of encoding the inter-coded portions comprises predicting the inter-coded portions such that the viewable frame is comprised of intra-coded portions and inter-coded portions that are directly or indirectly predicted from the intra-coded portions of the set of acquisition frames.

An apparatus for encoding multimedia frames, comprising means for encoding a set of acquisition frames including a viewable frame, each frame comprising one or more intra-coded portions and one or more inter-coded portions, wherein the means for encoding the intra-coded portions comprises means for positioning the intra-coded portions such that when the intra-coded portions of the set of acquisition frames are combined, a complete intra-coded composite frame is formed, and wherein the means for encoding the inter-coded portions comprises means for predicting the inter-coded portions such that the viewable frame is comprised of intra-coded portions and inter-coded portions that are directly or indirectly predicted from the intra-coded portions of the set of acquisition frames.

An electronic device for encoding multimedia frames, the electronic device configured to encode a set of acquisition frames including a viewable frame, each frame comprising one or more intra-coded portions and one or more inter-coded portions, to position the intra-coded portions such that when the intra-coded portions of the set of acquisition frames are combined, a complete intra-coded composite frame is formed, and to predict the inter-coded portions such that the viewable frame is comprised of intra-coded portions and inter-coded portions that are directly or indirectly predicted from the intra-coded portions of the set of acquisition frames.

A computer readable medium having instructions for causing a computer to execute a method of encoding multimedia frames, comprising: encoding a set of acquisition frames including a viewable frame, each frame comprising one or more intra-coded portions and one or more inter-coded portions, wherein the act of encoding the intra-coded portions comprises positioning the intra-coded portions such that when the intra-coded portions of the set of acquisition frames are combined, a complete intra-coded composite frame is formed, and wherein the act of encoding the inter-coded portions comprises predicting the inter-coded portions such that the viewable frame is comprised of intra-coded portions and inter-coded portions that are directly or indirectly predicted from the intra-coded portions of the set of acquisition frames.

A method of decoding multimedia frames, comprising receiving data representing a set of acquisition frames including a viewable frame, each frame comprising one or more intra-coded portions and one or more inter-coded portions, wherein the intra-coded portions are positioned such that when the intra-coded portions of the set of acquisition frames are combined, a complete intra-coded composite frame is formed, further wherein the inter-coded portions are predicted such that the viewable frame is comprised of intra-coded portions and inter-coded portions that are directly or indirectly predicted from the intra-coded portions of the set of acquisition frames, decoding the intra-coded portions of the set of acquisition frames and decoding the inter-coded portions of the viewable frame.

An apparatus for decoding multimedia frames, comprising means for receiving data representing a set of acquisition frames including a viewable frame, each frame comprising one or more intra-coded portions and one or more inter-coded portions, wherein the intra-coded portions are positioned such that when the intra-coded portions of the set of acquisition frames are combined, a complete intra-coded composite frame is formed, further wherein the inter-coded portions are predicted such that the viewable frame is comprised of intra-coded portions and inter-coded portions that are directly or indirectly predicted from the intra-coded portions of the set of acquisition frames, means for decoding the intra-coded portions of the set of acquisition frames, and means for decoding the inter-coded portions of the viewable frame.

An electronic device for decoding multimedia frames, the electronic device configure to receive data representing a set of acquisition frames including a viewable frame, each frame comprising one or more intra-coded portions and one or more inter-coded portions, wherein the intra-coded portions are positioned such that when the intra-coded portions of the set of acquisition frames are combined, a complete intra-coded composite frame is formed, further wherein the inter-coded portions are predicted such that the viewable frame is comprised of intra-coded portions and inter-coded portions that are directly or indirectly predicted from the intra-coded portions of the set of acquisition frames, further configured to decode the intra-coded portions of the set of acquisition frames and to decode the inter-coded portions of the viewable frame.

A computer readable medium having instructions for causing a computer to execute a method of decoding multimedia frames, comprising receiving data representing a set of acquisition frames including a viewable frame, each frame comprising one or more intra-coded portions and one or more inter-coded portions, wherein the intra-coded portions are positioned such that when the intra-coded portions of the set of acquisition frames are combined, a complete intra-coded composite frame is formed, further wherein the inter-coded portions are predicted such that the viewable frame is comprised of intra-coded portions and inter-coded portions that are directly or indirectly predicted from the intra-coded portions of the set of acquisition frames, decoding the intra-coded portions of the set of acquisition frames, and decoding the inter-coded portions of the viewable frame.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the examples.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person skilled in the art to make or use the disclosed examples. Various modifications to these examples will be readily apparent to those skilled in the art, and the principles defined herein may be applied to other examples without departing from the spirit or scope of the invention.

Thus, a method and system for enabling random access of a video stream from non-Intra-coded frames through use of intra-coded portions within otherwise temporally predicted frames, have been described.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or

What is claimed is:

1. A method of decoding a sequence of frames, comprising:
    receiving data representing a set of acquisition frames, enabling random access to the sequence of frames, including a viewable frame, each acquisition frame comprising one or more intra-coded portions and one or more inter-coded portions,
        wherein the intra-coded portions are positioned such that when the intra-coded portions of the set of acquisition frames are combined, a complete intra-coded composite frame is formed,
        further wherein the inter-coded portions are predicted such that the viewable frame is comprised of intra-coded portions and inter-coded portions that are directly or indirectly predicted from the intra-coded portions of the set of acquisition frames, wherein the set of acquisition frames provides a random access point for decoding the sequence of frames, wherein predicting the inter-coded portions of the set of acquisition frames comprises backward prediction to provide the random access point to the sequence of frames;
    decoding the intra-coded portions of the set of acquisition frames; and
    decoding the inter-coded portions of the viewable frame.

2. The method of claim 1, further comprising:
    combining the decoded intra-coded portions of the viewable frame and the decoded inter-coded portions of the viewable frame.

3. The method of claim 2, further comprising:
    displaying the combined viewable frame.

4. The method of claim 2, further comprising:
    storing the combined viewable frame.

5. The method of claim 1, further comprising:
    receiving the data representing the set of acquisition frames over a wireless network.

6. The method of claim 1, further comprising:
    receiving data representing one or more non-acquisition frames interspersed among the set of received acquisition frames, the non-acquisition frames containing no intra-coded or inter-coded portions necessary for decoding the viewable frame.

7. The method of claim 1, further comprising:
    locating the set of acquisition frames at a predetermined time interval.

8. An apparatus for decoding a sequence of frames, comprising:
    means for receiving data representing a set of acquisition frames, enabling random access to the sequence of frames, including a viewable frame, each acquisition frame comprising one or more intra-coded portions and one or more inter-coded portions, wherein the intra-coded portions are positioned such that when the intra-coded portions of the set of acquisition frames are combined, a complete intra-coded composite frame is formed, further wherein the inter-coded portions are predicted such that the viewable frame is comprised of intra-coded portions and inter-coded portions that are directly or indirectly predicted from the intra-coded portions of the set of acquisition frames, wherein the set of acquisition frames provides a random access point for decoding the sequence of frames, wherein predicting the inter-coded portions of the set of acquisition frames comprises backward prediction to provide the random access point to the sequence of frames;
    means for decoding the intra-coded portions of the set of acquisition frames; and
    means for decoding the inter-coded portions of the viewable frame.

9. The apparatus of claim 8, further comprising:
    means for combining the decoded intra-coded portions of the viewable frame and the decoded inter-coded portions of the viewable frame.

10. The apparatus of claim 9, further comprising:
    means for displaying the combined viewable frame.

11. The apparatus of claim 9, further comprising:
    means for storing the combined viewable frame.

12. The apparatus of claim 8, further comprising:
    means for receiving the data representing the set of acquisition frames over a wireless network.

13. The apparatus of claim 8, further comprising:
    means for receiving data representing one or more non-acquisition frames interspersed among the set of received acquisition frames, the non-acquisition frames containing no intra-coded or inter-coded portions necessary for decoding the viewable frame.

14. The apparatus of claim 8, further comprising:
means for locating the set of acquisition frames at a predetermined time interval.

15. An electronic device for decoding a sequence of frames, the electronic device configured to receive data representing a set of acquisition frames, enabling random access to the sequence of frames, including a viewable frame, each acquisition frame comprising one or more intra-coded portions and one or more inter-coded portions, wherein the intra-coded portions are positioned such that when the intra-coded portions of the set of acquisition frames are combined, a complete intra-coded composite frame is formed, further wherein the inter-coded portions are predicted such that the viewable frame is comprised of intra-coded portions and inter-coded portions that are directly or indirectly predicted from the intra-coded portions of the set of acquisition frames, further configured to decode the intra-coded portions of the set of acquisition frames and to decode the inter-coded portions of the viewable frame, wherein the set of acquisition frames provides a random access point for decoding the sequence of frames, and wherein predicting the inter-coded portions of the set of acquisition frames comprises backward prediction to provide the random access point to the sequence of frames.

16. The electronic device of claim 15, further configured to combine the decoded intra-coded portions of the viewable frame and the decoded inter-coded portions of the viewable frame.

17. The electronic device of claim 16, further configured to display the combined viewable frame.

18. The electronic device of claim 16, further configured to store the combined viewable frame.

19. The electronic device of claim 15, further configured to receive the data representing the set of acquisition frames over a wireless network.

20. The electronic device of claim 15, further configured to receive data representing one or more non-acquisition frames interspersed among the set of received acquisition frames, the non-acquisition frames containing no intra-coded or inter-coded portions necessary for decoding the viewable frame.

21. The electronic device of claim 15, further configured to locate the set of acquisition frames at a predetermined time interval.

22. A non-transitory computer readable medium encoded with computer executable instructions for causing a computer to execute a method of decoding a sequence of frames, comprising:

receiving data representing a set of acquisition frames, enabling random access to the sequence of frames, including a viewable frame, each acquisition frame comprising one or more intra-coded portions and one or more inter-coded portions, wherein the intra-coded portions are positioned such that when the intra-coded portions of the set of acquisition frames are combined, a complete intra-coded composite frame is formed, further wherein the inter-coded portions are predicted such that the viewable frame is comprised of intra-coded portions and inter-coded portions that are directly or indirectly predicted from the intra-coded portions of the set of acquisition frames, wherein the set of acquisition frames provides a random access point for decoding the sequence of frames, wherein predicting the inter-coded portions of the set of acquisition frames comprises backward prediction to provide the random access point to the sequence of frames;

decoding the intra-coded portions of the set of acquisition frames; and decoding the inter-coded portions of the viewable frame.

\* \* \* \* \*